United States Patent Office 3,061,621
Patented Oct. 30, 1962

3,061,621
PROCESS FOR PRODUCING CARBOXYLIC ACIDS FROM OLEFINS, CARBON MONOXIDE AND WATER
Herbert Koch and Karl Erich Möller, Mulheim (Ruhr), Germany, assignors to Studiengesellschaft Kohle m.b.H., Mulheim (Ruhr), Germany
No Drawing. Filed Jan. 19, 1960, Ser. No. 3,243
Claims priority, application Germany Jan. 26, 1959
14 Claims. (Cl. 260—413)

This invention relates to a process for producing carboxylic acids from olefins, carbon monoxide, and water.

The synthetic production of carboxylic acids from olefins (or alcohols), carbon monoxide and water in the presence of various catalysts is known for a long time. Among the catalysts suited for this synthesis and mentioned in a number of literature references is phosphoric acid. Ullmann's "Enzyklopädie der technischen Chemie," 3rd ed., vol. 5 (1954) states on page 121:

"Also included in the carbonylation reactions in a broader sense is the addition of carbon monoxide and water to olefins or of carbon monoxide to alcohols, ether, etc., in the presence of acid catalysts at high temperatures and extremely high pressures. These processes are described in patents by a number of German and, above all, British and American companies (see page 137), but are of practically no importance at the present time."

and on page 137:

"The addition of carbon monoxide (and water) to olefins, alcohols, ethers, etc. in the presence of preferably acid catalysts at elevated pressures and temperatures is disclosed in a great number of patents. However, all of these patents did not achieve commercial importance. They are listed in Table 1."

For the reaction of olefins with carbon monoxide and water, 26 patents owned by Du Pont de Nemours are listed in the above-mentioned Table 1. In seven of these patents, phosphoric acid is mentioned as the catalyst and, with one exception, always supported on activated charcoal. Moreover, the Du Pont process, as is known, should be operated at very high pressures of practically 200 to 1000 atmospheres and at temperatures in excess of 100° and practically of 200° to 400° C. This is, for example, also apparent from H. J. Astle's book "The Chemistry of Petrochemicals," 1956, which states on page 85:

"Other Carbonylation Reactions. In the presence of acid catalysts such as $H_3PO_4$, $H_2SO_4$, HCl, $BF_3$ etc., olefins react with carbon monoxide and water to form acids. This reaction usually requires temperatures of 300–400° C. and pressures of 200–1000 atmospheres. Thus ethylene is converted into propionic acid and propylene into isobutyric acid."

It is not only Ullmann's Enzyklopädie which characterizes this process as commercially unimportant. H. Kröper, in Houben-Weyl "Methoden der organischen Chemie," 4th ed., vol. IV/2 (1955), pp. 375–376, expressed his opinion on the Du Pont process as follows:

"The addition of carbon monoxide and water to olefin hydrocarbons is the subject matter of a great number of patents which in most cases disclose acid catalysts such as boron fluoride, phosphoric acid, hetero-polyacids, metal halides, which, either as such or deposited on large surface carrier materials, are used at temperatures of 200 to 300° C. and pressures of 700 to 1000 atmospheres.... These reactions which almost exclusively were carried out in the gaseous phase with lower olefin hydrocarbons are of minor practical importance."

A basically different process was developed in Max-Planck-Institut für Kohlenforschung (see "Brennstoff-Chemie," vol. 36 (1955), pp. 321–328, "Fette, Seifen, Anstrichmittel," vol. 59 (1957), pp. 493–498, and German Patent No. 942,987). In this process, it is important above all that the essential first synthesis stage, i.e. the addition of carbon monoxide to the olefin, is operated in the absence of free water, i.e. water which is not chemically combined. Accordingly, use is theoretically made of catalysts which do not contain more water than the compounds $SO_3 \cdot 2H_2O$ and $BF_3 \cdot 2H_2O$, practically at least 90% sulphuric acid, anhydrous hydrogen fluoride alone or with the addition of boron trifluoride, and monohydroxy fluoboric acid alone or its complex mixtures with phosphoric acid or sulphuric acid. It is not earlier than upon completion of the incorporation of carbon monoxide, at which time an intermediate has formed, that water is added which permits the separation of the reaction product into the catalyst and an organic phase containing the carboxylic acid. Relatively low temperatures of 0–70° C. and pressures of 1 to 100 atmospheres may be used in this process. As far as higher pressures are used, they serve to prevent migration of the methyl group and to suppress the dimerization.

In applicant's German Patent No. 972,291 having as its object the performance of this synthesis with monohydroxy fluoboric acid or complex compounds thereof with phosphoric acid or sulphuric acid, which complex compounds contain no free water, it is stated in both the initially filed and the published application documents (page 6, lines 2–3 of the latter) and in the corresponding British Patent No. 798,065, page 3, lines 121–123:

"On the other hand, concentrated phosphoric acid when used by itself proves to be completely inactive."

It has now surprisingly been found that, in contrast to applicant's previous opinion, it is also possible to use phosphoric acid alone as the catalyst for specific olefins provided that definite conditions are complied with. These conditions, as far as the reaction temperature is concerned, are generally more severe than those of the processes with different catalysts mentioned above and previously developed in the Max-Planck-Istitut für Kohlenforschung, but substantially less severe as far as both the reaction temperature and the pressure are concerned than the practically used conditions of the Du Pont process which did not attain commercial importance. Exactly as in case of applicant's known processes, it is decisive for the successful performance of the carboxylic acid synthesis using phosphoric acid alone as the catalyst that the addition of carbon monoxide to the olefin is effected in the absence of free water, i.e. with a phosphoric acid which contains less water than is contained in the compound $P_2O_5 \cdot 5H_2O$. Accordingly use must be made of at least 90% and preferably 95–100% orthophosphoric acid or derivatives thereof which are still poorer in water such as pyrophosphoric acid or higher polyphosphoric acids or mixtures thereof. (As to the composition of condensed phosphoric acids, reference is made to F. D. Popp and W. E. McEven "Chemical Reviews" 58, 324 (1958).)

The temperatures required when operating with phosphoric acid are generally higher than those employed when using applicant's previously preferred catalysts. Temperatures of about 50 to 150° C. are used. However, if possible, the higher range is avoided in view of the corrosion which becomes serious at this level. The optimum with respect to the synthesis conditions, on the one hand, and the avoidance of corrosion, on the other hand, is reached at temperatures of 75–95° C.

As regards the pressure of carbon monoxide, pressures of 1 to 250 atmospheres may be used, the preferred pressure being 10 to 100 atmospheres.

The relative proportions of the olefin and phosphoric acid to be used in the process must be such that at least 1 mol of phosphoric acid is used per mol of olefin. In general, more than 2 mols and preferably 4 to 8 mols of phosphoric acid per mol of olefin will be used. However, even higher amounts of phosphoric acid may be advantageous in certain cases.

Under these conditions, specific olefins can be converted into carboxylic acids with satisfactory to very favorable results, these olefins being those with 5 to 12 carbon atoms, it being rather unimportant whether they are straight-chained or branched-chained or cyclic. Good to very good results are obtained with normal olefins having from 5 to 10 carbon atoms, branched olefins within this range of carbon numbers such as 2-methyl-pentene-1 and trimeric propene, and with cyclic olefins such as octalin or cyclododecatriene.

The process of the invention offers the particular advantage that, upon completion of the addition of carbon monoxide, the reaction product readily separates into two layers, the upper of which contains the carboxylic acids desired. The lower phase is the catalyst which is returned into the process.

Due to the separation of layers which occurs after the incorporation of the carbon monoxide in case of using concentrated phosphoric acid as the catalyst, this mode of operation differs quite considerably from the operation with applicant's previously favored catalysts which cannot be separated from the reaction product until water has been added thereto.

The concentrated phosphoric acid is capable under the conditions used in accordance with the invention of giving off the water chemically combined therein for the formation of carboxylic acids which, in the reaction product, are no longer bound to the phosphoric acid.

The release of chemically combined water in case of using concentrated phosphoric acid as the catalyst is made possible by the partial transition of orthophosphoric acid into pyrophosphoric acid which is poorer in water or into still higher molecular weight polyphosphoric acids.

The quantity of water stoichiometrically required to form the carboxylic acids must, of course, also be added to the reaction system. This may be done in different manners. For example, the water may advantageously be added to the reaction product upon completion of the synthesis thereby favoring still more the separation of layers.

A further particular advantage of the process of the invention resides in the fact that single-stage operation is possible because of this readily occurring separation of layers, which is important in view of a completely continuous operation of the process. In this case, the synthesis is effected with a catalyst which contains a higher content of phosphorous pentoxide corresponding to the quantity of olefin to be converted. During the reaction, the quantity of water required for the stoichiometric formation of the carboxylic acid is introduced together with the olefin or separately.

The separation of layers may also be promoted by using light hydrocarbons, e.g. commercial hexane, as diluents.

Besides this ready separability of the phosphoric acid, its cheapness is a particular advantage of the new process. These advantages will be particularly pronounced if the material of the reactors and the temperature are adapted to each other such that a marked corrosion will not occur.

*Example 1*

336 gms. (4 mols) of hexene-1 diluted with 750 ml. of commercial grade n-hexane were injected within 1.5 hours and at a temperature of 85–90° C. into a 5 liter stainless steel autoclave equipped with a magnetic stirrer and containing 985 ml.=19 mols of 100% $H_3PO_4$ and being under a carbon monoxide pressure of 100 atmospheres. Upon a total of 8 hours, the reaction product was removed from the autoclave and mixed with water in amount stoichiometrically required for the formation of the carboxylic acid (3 mols with a 75% yield) thereby completely separating the catalyst.

The carboxylic acids were separated from the organic phase by way of the alkali salts. Their amount was 371 grams which, as evidenced by fractional distillation, consisted of 87% $C_7$ acids and 13% $C_{13}$ acids. This corresponded to a total yield of 74% based on olefin charged. The recovered catalyst was used with the same success for three additional experiments.

*Example 2*

(a) Under the conditions described in Example 1, 392 gms. (4 mols) of heptene-1 were converted on 985 ml. of a 100% $H_3PO_4$ used as the catalyst. The reaction product was diluted with 500 ml. of commercial grade hexane to aid the separation of phases. Upon separation of the catalyst, the reaction product was processed resulting in 437 gms. of carboxylic acids by way of the alkali salts. As evidenced by the acid number, the carboxylic acids consisted of more than 90% of $C_8$ acids (theoretical acid number, 389) corresponding to a total yield of 77% based on olefin charged. The separated catalyst to which the water withdrawn for the formation of carboxylic acids was added again was used under the same conditions for four additional batches without a decrease in its activity taking place.

(b) When converting one mol of heptene-1 with 1104 gms. of a catalyst of the composition 4 mols $H_3PO_4$+4 mols $H_4P_2O_7$ (corresponding to a $P_2O_5$ content of 77.2%) under the same conditions as those used in Example 2(a) with a 100% $H_3PO_4$, a 52% yield of carboxylic acids based on olefin charged was obtained.

*Example 3*

The procedure was the same as in Example 1 except that the $C_6$–$C_8$ cut of an olefin-rich product obtained from a cracking operation and predominantly containing unbranched olefins was used as the starting material. By converting 400 gms. of the $C_6$–$C_8$ fraction, adding 500 ml. of commercial grade n-hexane to the discharged reaction product and separating the catalyst, 390 grams of carboxylic acids were isolated by way of the alkali salts. The acids consisted of 95% $C_7$, $C_8$ and $C_9$ carboxylic acids corresponding to a total yield of 68% based on the amount of olefin charged.

The separated catalyst to which the water withdrawn for the formation of carboxylic acids was added could be re-used under completely constant conditions for five additional runs, in some of which even higher yields were obtained (run 6, 76% yield). The separation of the catalyst could be accelerated considerably by short-time centrifuging.

*Example 4*

500 ml.=936 gms. of a 100% $H_3PO_4$ were placed into a 2 l. stainless steel autoclave equipped with magnetic stirring means. Under a CO pressure of 100 atmospheres and at a temperature of 140–145° C., 2 mols (224 gms.) of octene-1 were injected. The reaction product withdrawn after 3.5 hours was mixed with 500 ml. of light gasoline and the amount of water (2 mols) stoichiometrically required for the formation of carboxylic acids. In doing so, complete separation of the catalyst was achieved.

The carboxylic acids formed were recovered from the organic phase by fractional distillation in vacuo. The total quantity was 226 grams of which 95% were $C_9$ acids and 5% were $C_{17}$ acids. Total yield was 72% based on olefin charged.

In a second run, additional 2 mols of octene-1 were reacted with CO under the same conditions using the catalyst recovered from the first run. Here again, carboxylic acids in a yield of 73% could be isolated.

The series of experiments were extended to a total of five runs with constant re-use of the catalyst and with equally good yields being obtained throughout the runs.

Example 5

(a) 168 gms. (2 mols) of 2-methyl pentene-1 diluted with 250 ml. of n-hexane were injected within 40 minutes into a 2 l. stainless steel autoclave equipped with magnetic stirring means, containing 620 ml. of a 100% $H_3PO_4$ and maintained under a CO pressure of 200 atmospheres and a temperature of 90–100° C. After a total of 5 hours, the reaction product was discharged, mixed with 500 ml. of n-hexane and processed in usual manner after separation of the catalyst.

The quantity of carboxylic acids isolated was 200 gms. of which 77% consisted of about equal parts of the two tertiary $C_7$ acids α,α-dimethyl-valeric acid and α-methyl-α-ethyl-butyric acid and 23% consisted of $C_{13}$ acids. Total yield was 81% based on olefin charged.

The series of experiments were extended to a total of four runs, in each of which the catalyst from the preceding run was re-used without a decrease in activity of the same taking place. The water withdrawn from the catalyst for the formation of carboxylic acids was replaced in each case.

(b) In a second batch, 2 mols of 2-methyl pentene-1 were reacted with 500 ml. of an 85% $H_3PO_4$ as the catalyst at a temperature of 90–100° C. and a CO pressure of 100 atm. After a total of 6 hours of reaction time, only 53 gms. of $C_7$ acids corresponding to a yield of 20% based on olefin charged were obtained by usual processing by way of the alkali salts.

Example 6

0.5 mol octalin diluted with 75 ml. of n-hexane reacted at a temperature of 75–85° C. and a CO pressure of 50 atmospheres with 620 ml. of a 100% $H_3PO_4$ contained in a 2 l. autoclave equipped with magnetic stirring means. Upon separation of the catalyst and processing by way of the alkali salts, 67 gms. of decalin-carboxylic acid-9 were isolated. This corresponded to a yield of 74% based on olefin charged.

In a second run in which the catalyst separated from the first batch was re-used after replacement of the water withdrawn for the formation of carboxylic acid, the yield was even 93% of $C_9$ acids based on 0.5 mol of olefin charged.

Example 7

By the procedure described in Example 6, 2 mols of cyclododecatriene-1,5,9 diluted with 300 ml. of commercial grade n-heptane were converted at temperatures of 80–90° C. and a CO pressure of 100 atmospheres. The reaction product discharged after a total of 5 hours was mixed with 1.5 mols of water for complete separation of the catalyst, and the carboxylic acids were separated from the organic phase by way of their alkali salts. There could be isolated 256 gms. corresponding to 62% of a monocarboxylic acid which was solid at room temperature and had the empirical formula $C_{13}H_{20}O_2$ and a molecular weight of 208.

The series of experiments were extended to a total of six runs, in each of which the catalyst was re-used without decreasing in activity.

Example 8

(a) 252 gms. (2 mols) of trimeric propene were injected within 40 minutes at a CO pressure of 100 atmospheres and a temperature of 100° C. into a 2 l. autoclave equipped with magnetic stirring means and containing 500 ml. of a 100% $H_3PO_4$. After a total of 9 hours, the reaction product was discharged and mixed with 500 ml. of commercial grade hexan and, for complete separation of the catalyst, with 1 mol of $H_2O$. Processing of the organic phase via the alkali salts yielded 176 gms. of $C_{10}$ carboxylic acids corresponding to 51% based on olefin charged.

(b) In a second run, additional 2 mols of trimeric propene were reacted with 500 ml. of a 85% $H_3PO_4$ as the catalyst under a CO pressure of 100 atmospheres and a temperature of 126° C. After a total of 8 hours of reaction time, the reaction product discharged from the autoclave was processed in usual manner. In doing so, only 21 gms. of $C_{10}$ acids corresponding to 6.1% based on olefin charged could be isolated. The separated catalyst was of green color, this phenomenon indicating serious corrosion.

Example 9

In a further experiment, 2-methylpentene-1 was reacted in continuous single-stage operation to form carboxylic acid. The cylindrical reaction vessel which was made of stainless steel and equipped with an efficient magnetic stirrer had a capacity of 5 litres and was provided at the bottom with bores for valves for introducing the catalyst and for injecting olefin and water. Provided in the upper half of the electrically heated pressure vessel was a further valve permitting continuous withdrawal of reaction product during the experiment, a liquid stock of about 3.5 litres being maintained within the autoclave.

The test was run at a carbon monoxide pressure maintained at a constant level of 80 atmospheres and at a temperature of 85–90° C. The catalyst circulating in the system contained 74% of phosphorous pentoxide and corresponded to a composition of $6H_3PO_4+1H_4P_2O_7$. Introduction of the catalyst into the reaction vessel by means of a pressure feed pump was at a rate of about 1 litre/hr. corresponding to about 20 mols of catalyst of the composition mentioned above. At the same time, 210 gms./hr. (corresponding to 2.5 mols) of 2-methyl-pentene-1 diluted with 400 ml. of commercial grade n-hexane were injected. The quantity of water simultaneously introduced was 36 grams (2 mols).

The reaction product corresponding to the amounts of components introduced was discharged from the pressure vessel and transferred into a settler where separation into layers took place. The catalyst obtained as the lower phase was returned into the process while the upper organic phase was processed to obtain carboxylic acids. This processing was effected in usual manner by way of the alkali salts. The yield of carboxylic acids, on an average, was 80% of the theory based on olefin charged. Fractional distillation yielded a product which consisted of 75% of tertiary $C_7$-acids and 25% of $C_{13}$-acids.

The experiment was extended to 100 hours without a decrease in catalytic acitvity taking place. During this test period, 19.5 kilograms of $C_7$-acids and 2.5 kilograms of $C_{13}$-acids were obtained from a total of 21 kilograms (corresponding to 250 mols) of 2-methyl-pentene-1.

What we claim is:

1. In the process for the production of carboxylic acids by reaction of an olefin with carbon monoxide in the presence of a catalyst, the improvement which comprises effecting said reaction by contacting an olefin selected from the group consisting of straight-chain, branched-chain and cyclic olefins having from 5 to 12 carbon atoms in their molecule, in the liquid phase with carbon monoxide at a temperature between about 50 and 150° C. under substantially anhydrous conditions in the presence of a catalyst containing less than 10% chemically combined water selected from the group consisting of orthophosphoric acid, derivatives of orthophosphoric acid, higher polyphosphoric acids and mixtures thereof, and thereafter adding water to the reaction mixture forming a layer containing the formed carboxylic acid, and a separate layer containing separated catalyst suitable for direct reuse.

2. Improvement according to claim 1 in which said catalyst is a 95 to 100% orthophosphoric acid.

3. Improvement according to claim 1 in which said catalyst is pyrophosphoric acid.

4. Improvement according to claim 1 in which said contacting is effected at a temperature between about 75 and 95° C.

5. Improvement according to claim 1 in which said contacting is effected at an elevated pressure of between about 1 and 250 atmospheres.

6. Improvement according to claim 5 in which said contacting is effected at a pressure between about 10 and 100 atmospheres.

7. Improvement according to claim 1 in which more than 2 mols of said catalyst are used per mol of olefin.

8. Improvement according to claim 7 in which from 4 to 8 mols of said catalyst are used per mol of olefin.

9. Improvement according to claim 1 in which stoichiometric quantity of water is added.

10. Improvement according to claim 1 in which said separation into layers is promoted by use of a diluting agent.

11. Improvement according to claim 10 in which said diluting agent is a light hydrocarbon.

12. Improvement according to claim 1 in which said reaction is effected continuously by introducing during said contacting said olefin together with water at the rate required for the stoichiometrical formation of said carboxylic acid.

13. Improvement according to claim 1 in which said reaction is effected continuously by introducing during said contacting but separately from said olefin, water at the rate required for the stoichiometrical formation of said carboxylic acid.

14. In the process for the production of carboxylic acids by reaction of an olefin with carbon monoxide in the presence of a catalyst, the improvement which comprises effecting said reaction by contacting an olefin selected from the group consisting of straight-chain, branched-chain and cyclic olefins having from 5 to 12 carbon atoms in their molecule, in the liquid phase with carbon monoxide at a temperature between about 50 and 150° C. under substantially anhydrous conditions in the presence of as catalyst a phosphoric acid containing less water than is contained in the compound $P_2O_5 \cdot 5H_2O$.

References Cited in the file of this patent

UNITED STATES PATENTS

| | | |
|---|---|---|
| 1,924,766 | Carpenter | Aug. 29, 1933 |
| 2,876,241 | Koch | May 3, 1959 |